_United States Patent_ [19]

Yamade

[11] Patent Number: 5,103,297
[45] Date of Patent: Apr. 7, 1992

[54] APPARATUS FOR CARRYING OUT Y/C SEPARATION

[75] Inventor: Shigemitsu Yamade, Otsu, Japan

[73] Assignee: Matsushita Electric Industrial Co., Ltd., Osaka, Japan

[21] Appl. No.: 650,169

[22] Filed: Feb. 4, 1991

[30] Foreign Application Priority Data

Feb. 16, 1990 [JP] Japan ................................ 2-036544

[51] Int. Cl.⁵ .............................................. H04N 9/78
[52] U.S. Cl. ........................................ 358/31; 358/26
[58] Field of Search ............................ 358/31, 26, 147

[56] References Cited

U.S. PATENT DOCUMENTS 4,972,259  11/1990  Motoe et al. ........................ 358/31
4,994,906   2/1991  Moriwake ............................ 358/31
5,014,118   5/1991  Shirai ................................. 358/31

FOREIGN PATENT DOCUMENTS 1-29187  1/1989  Japan .
1-30388  2/1989  Japan .
271692   3/1990  Japan .

Primary Examiner—James J. Groddy
Assistant Examiner—Kim Yen Vu
Attorney, Agent, or Firm—Stevens, Davis, Miller & Mosher

[57] ABSTRACT

An apparatus for carrying out the Y/C separation of a composite color video signal used in a television receiver, a video cassette recorder and other and for carrying out the Y/C separation of various signals superposed on the video signal in the vertical retrace interval thereof, without distorting the various signals is disclosed in which apparatus a switching operation is performed so that the composite color video signal itself is used as a luminance signal in the teletext period of the vertical retrace interval of the composite color video signal, and a Y/C separator of the non-correlation type is switched to operate in the remaining period of the vertical retrace interval.

13 Claims, 4 Drawing Sheets

APPARATUS FOR CARRYING OUT Y/C SEPARATION

BACKGROUND OF THE INVENTION

The present invention relates to the Y/C separation of a composite color picture signal used in a television receiver, a video tape recorder (VTR), and others.

Recently, in order to improve not only the picture quality of a high-resolution VTR such as a VTR of the S-VHS type but also the picture quality of a home VTR and a television receiver, a comb filter which utilizes vertical correlation to obtain a high resolution, has been generally used as the Y/C separator of a composite color picture signal (hereinafter referred to as "composite color video signal").

Further teletext which is one of new media utilizing the electromagnetic wave for television, has been put to practical use. A teletext signal as well as reference signals for broadcasting such as a ghost cancel reference (GCR) signal, a multiburst signal and a modulated sinusoidal wave signal is sent in the vertical retrace interval of a television signal. Further, in the vertical retrace interval of a video disk of the laser type, reference signals such as a color bar signal are superposed on a video signal. When the television or video signal is reproduced, a transmission system can be checked by observing the waveforms of the reference signals inserted in a broadcasting wave or laser vision.

Signals on a plurality of lines in the vertical retrace interval are independent of each other, and thus correlation does not exist between the lines. Accordingly, when the Y/C separation of the reference signals are carried out by means of the above-mentioned comb filter, the reference signals will be greatly distorted.

For example, in a case where the picture recording of the teletext is made, even when a VTR of the S-VHS type having a sufficient band-width is used, an error will be frequently produced in the output of a teletext decoder applied with a recorded and reproduced video signal. Further, reference signals which are superposed on a video signal in the vertical retrace interval thereof cannot be used to check a reproducing system including a Y/C separator, because the reference signals are distorted by Y/C separation. A method of making possible the picture recording of the teletext is disclosed in a Japanese patent application JP-A-hei 2-71,692. In this method, a comb filter used for Y/C separation is by-passed in the vertical retrace interval.

The above-mentioned conventional Y/C separator will be explained below with reference to FIG. 4.

FIG. 4 is a block diagram showing the circuit configuration of the conventional Y/C separator. In FIG. 4, reference numeral 1 designates an input terminal applied with a composite signal, 2 a comb filter which is made up of a 1-H delay circuit 21, an adder 22, a subtracter 23 and ½ attenuators 24a and 24b, and is used in an NTSC color television system, 3 a synchronous separation circuit for generating a pulse in the vertical retrace interval, 4 a switching circuit for performing a switching operation in response to the pulse from the synchronous separation circuit 3, 5 an output terminal for delivering a luminance signal Y, and 6 an output terminal for delivering a color signal C.

The operation of the Y/C separator having the above circuit configuration will be explained.

An inputted video signal $V_{in}$ is applied to the comb filter 2. In the NTSC color television system, the luminance signal Y of a first signal is in phase with the luminance signal Y of a second signal which is obtained by delaying the first signal by a time corresponding to one horizontal scanning line, but the color signal C of the first signal is 180° out of phase with the color signal C of the second signal. Accordingly, on the basis of the vertical correlation of a general video signal, the comb filter 2 can detect the luminance signal Y from the sum of the first and second signals and can detect the color signal C from the difference between the first signal and the second signal. The movable contacts of the switching circuit 4 are usually put on the a-side, and thus the luminance signal Y and color signal C from the comb filter 2 are sent to the output terminals 5 and 6, respectively.

When a vertical retrace interval is started, the synchronous separation circuit 3 generates a changeover pulse, and thus the movable contacts of the switching circuit 4 are put on the b-side. As a result, in the vertical retrace interval, the input signal $V_{in}$ is sent to the output terminal 5, as it is, to be used as the outputted luminance signal $Y_{out}$, and the outputted color signal $C_{out}$ becomes zero. Accordingly, a teletext signal which is superposed on the video signal in the vertical retrace interval thereof, is delivered as the outputted luminance signal $Y_{out}$, without being distorted.

According to the Y/C separator of FIG. 4, however, there arises a problem that a color signal which is superposed on the video signal in the vertical retrace interval thereof is made monochrome.

Accordingly, it has been earnestly desired to develop a Y/C separator which can carry out the Y/C separation of various signals superposed on a video signal in the vertical retrace interval thereof other than the teletext signal, while making the distortion of the above signals as small as possible.

SUMMARY OF THE INVENTION

It is an object of the present invention to provide an apparatus for carrying out Y/C separation which apparatus can solve the above problem of the prior art, and can not only carry out Y/C separation of a video signal but also can carry out the Y/C separation of various signals which are superposed on the video signal in the vertical retrace interval thereof, without distorting the various signals.

In order to attain the above object, an apparatus for carrying out Y/C separation in accordance with the present invention comprises a synchronous separation circuit for a video signal, a teletext detection circuit for detecting a teletext signal present in the vertical retrace interval of the video signal, a Y/C separation circuit of the non-correlation type which does not utilize line correlation, a monochrome detection circuit, and changeover means for changing one of Y/C separation methods over to another method.

In the above-mentioned Y/C separation apparatus according to the present invention, one of two kinds of operations in the vertical retrace interval is changed over to the other operation by the changeover means. That is, in the teletext period of the vertical retrace interval of a composite color video signal, the composite color video signal is outputted, as it is, to be used as a luminance signal. In the remaining period of the vertical retrace interval, the Y/C separation circuit of the non-correlation type is used.

DESCRIPTION OF THE PREFERRED EMBODIMENT

Now, an embodiment of the present invention will be explained below, with reference to the drawings.

Figure 1:
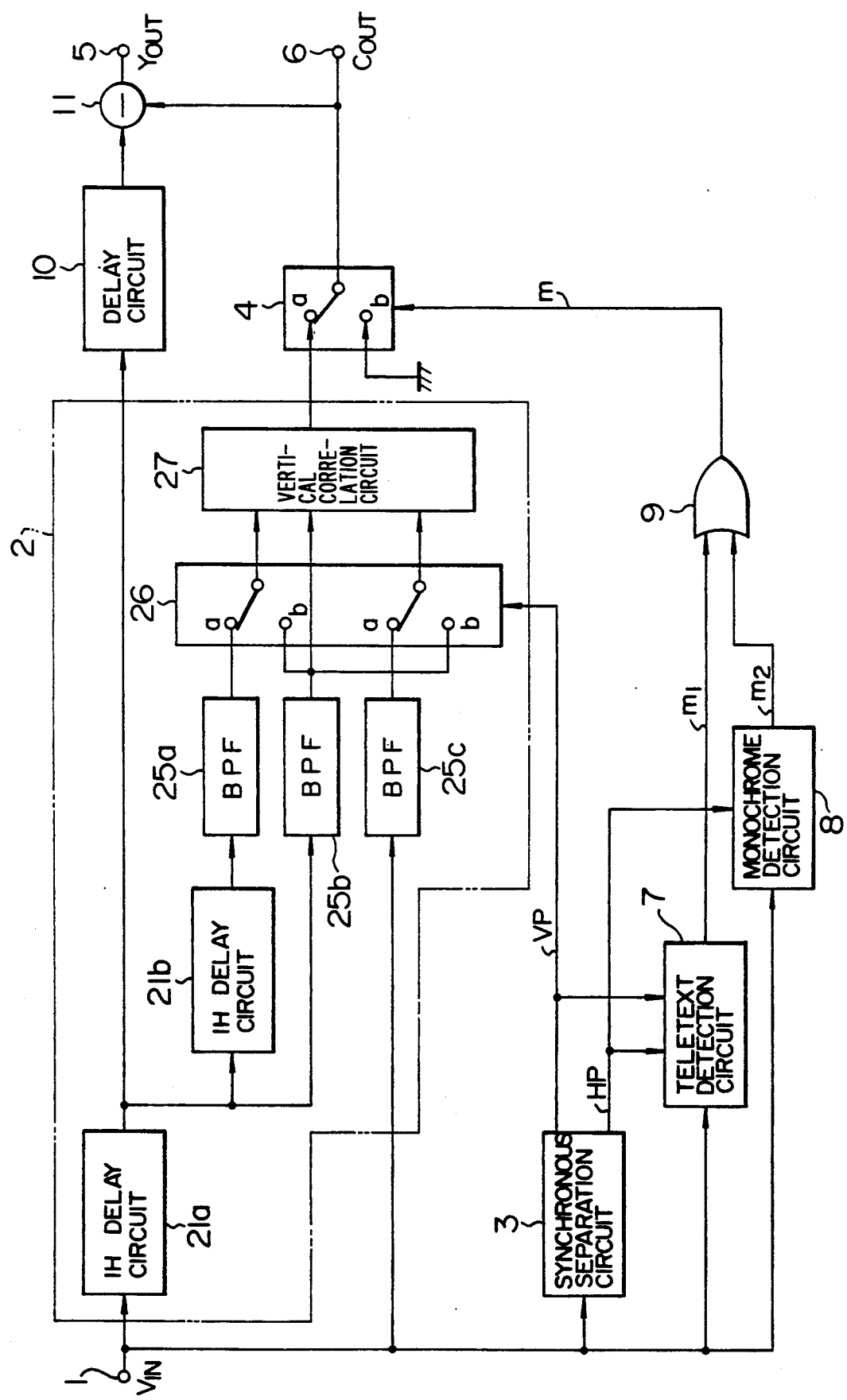
FIG. 1 is a block diagram showing the circuit configuration of an embodiment of an apparatus for carrying out Y/C separation in accordance with the present invention.

FIG. 1 is a block diagram showing the circuit configuration of an embodiment of an apparatus for carrying out Y/C separation in accordance with the present invention.

In FIG. 1, reference numeral 2 designates a chrominance signal separation circuit for separating a chrominance signal (that is, color signal) from an input signal. As shown in FIG. 1, the chrominance signal separation circuit 2 is made up of 1-H delay circuits 21a and 21b, band pass filters 25a, 25b and 25c, a switching circuit 26, and a vertical correlation circuit 27. The 1-H delay circuit 21a is formed of a CCD delay element, and has a frequency band film hundreds of hertzs to several megahertze. The vertical correlation circuit 27 is formed of the so-called 3-line logical comb filter, and the switching circuit 26 changes one of the vertical correlation type operation and non-correlation type operation of the chrominance signal separation circuit 2 over to the other operation.

Figure 2:
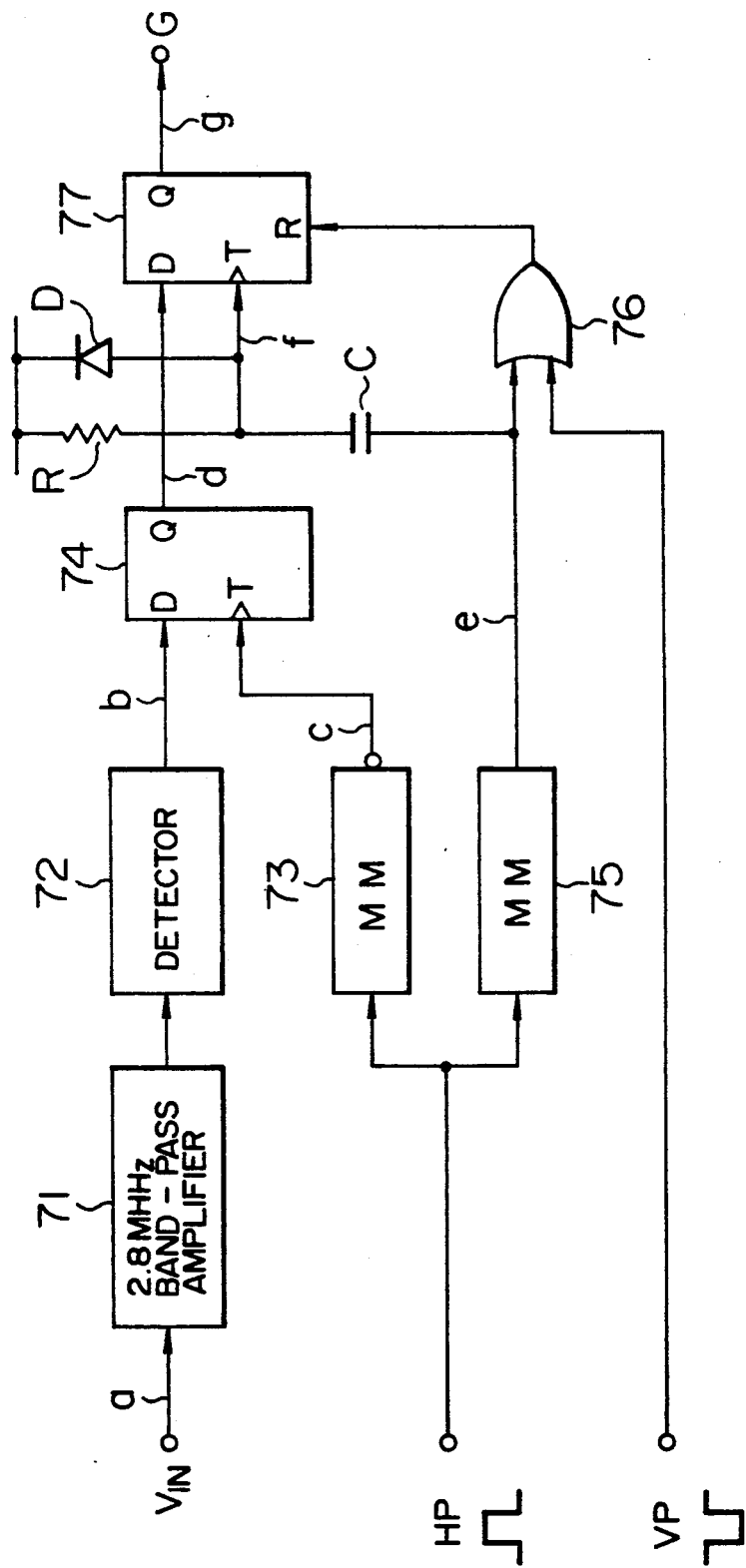
FIG. 2 is a block diagram showing the detailed circuit configuration of the teletext detection circuit of FIG. 1.

Further, in FIG. 1, reference numeral 3 designates a synchronous separation circuit for separating horizontal and vertical synchronizing signals from the input signal, 7 a teletext detection circuit having the circuit configuration of FIG. 2 for generating a changeover pulse in a teletext period, 8 a monochrome detection circuit for generating a changeover pulse in a case where a monochrome video signal is used as the input signal, 9 an OR circuit for obtaining the logical sum of the output of the teletext detection circuit 7 and the output of the monochrome detection circuit 8, 10 a delay circuit for delaying a composite color video signal so that the delay time of the composite color video signal becomes equal to the delay time of a color signal, and 11 a subtractor for subtracting the color signal from the composite color video signal to obtain a luminance signal.

FIG. 2 is a block diagram showing the detailed circuit configuration of the teletext detection circuit 7. In FIG. 2, reference numeral 71 designates a 2.8 MHz band-pass amplifier which uses a ceramic filter to narrow a pass band, 72 a detector (that is, detection circuit), 73 and 75 monostable multivibrators (MM's), 74 and 77 D-type flip-flop circuits, and 76 an OR circuit. Further, in FIG. 2, reference character C designates a capacitor, R a resistor, and D a diode for protecting the flip-flop circuit 77. The capacitor C and the resistor R make up a differentiating circuit.

The operation of the present embodiment having the above-mentioned circuit configuration will be explained below with reference to FIGS. 1 to 3.

Referring first to FIG. 1, an inputted video signal $V_{in}$ is applied to each of the chrominance signal separation circuit 2, the synchronous separation circuit 3, the teletext detection circuit 7 and the monochrome detection circuit 8.

The video signal $V_{in}$ applied to the chrominance signal separation circuit 2 is delayed by the 1-H delay circuit 21a by a time equal to one horizontal scanning period, and is further delayed by the 1-H delay circuit 21b by a time equal to one horizontal scanning period. That is, the video signal $V_{in}$ is delayed by the delay circuits 21a and 21b by a time twice as long as one horizontal scanning period. The output of the delay circuit 21b, the output of the delay circuit 21a, and the inputted video signal $V_{in}$ are applied to band-pass filters 25a, 25b, and 25c, respectively.

In an ordinary scanning period, movable contacts of the switching circuit 26 are put on the a-side. Thus, the outputs of the band-pass filters 25a, 25b and 25c are applied to the vertical correlation circuit 27, in which a chrominance signal is obtained as the result of vertical correlation calculation among three lines.

While, in a vertical retrace interval, the synchronous separation circuit 3 delivers a vertical blanking pulse VP to put the movable contacts of the switching circuit 26 on the b-side. Thus, three input terminals of the vertical correlation circuit 27 are all applied with the output of the band-pass filter 25b, that is, the video signal delayed by one horizontal scanning period, and the video signal delayed by one horizontal scanning period is delivered from the vertical correlation circuit 27, as it is. As a result, vertical correlation calculation is not carried out, but the same chrominance signal C as that separated by the band-pass filters 25a to 25c is obtained.

The teletext detection circuit 7 detects that a horizontal scanning period in the vertical retrace interval is used for teletext. In a case where a teletext signal exists in the above period, the teletext detection circuit 7 generates a monochrome indicating pulse m1 in the next horizontal scanning period of the vertical retrace interval. FIG. 2 shows an example of the actual circuit configuration of the teletext detection circuit 7. The operation of the teletext detection circuit having the circuit configuration of FIG. 2 will be explained below with reference to FIG. 3.

Figure 3:
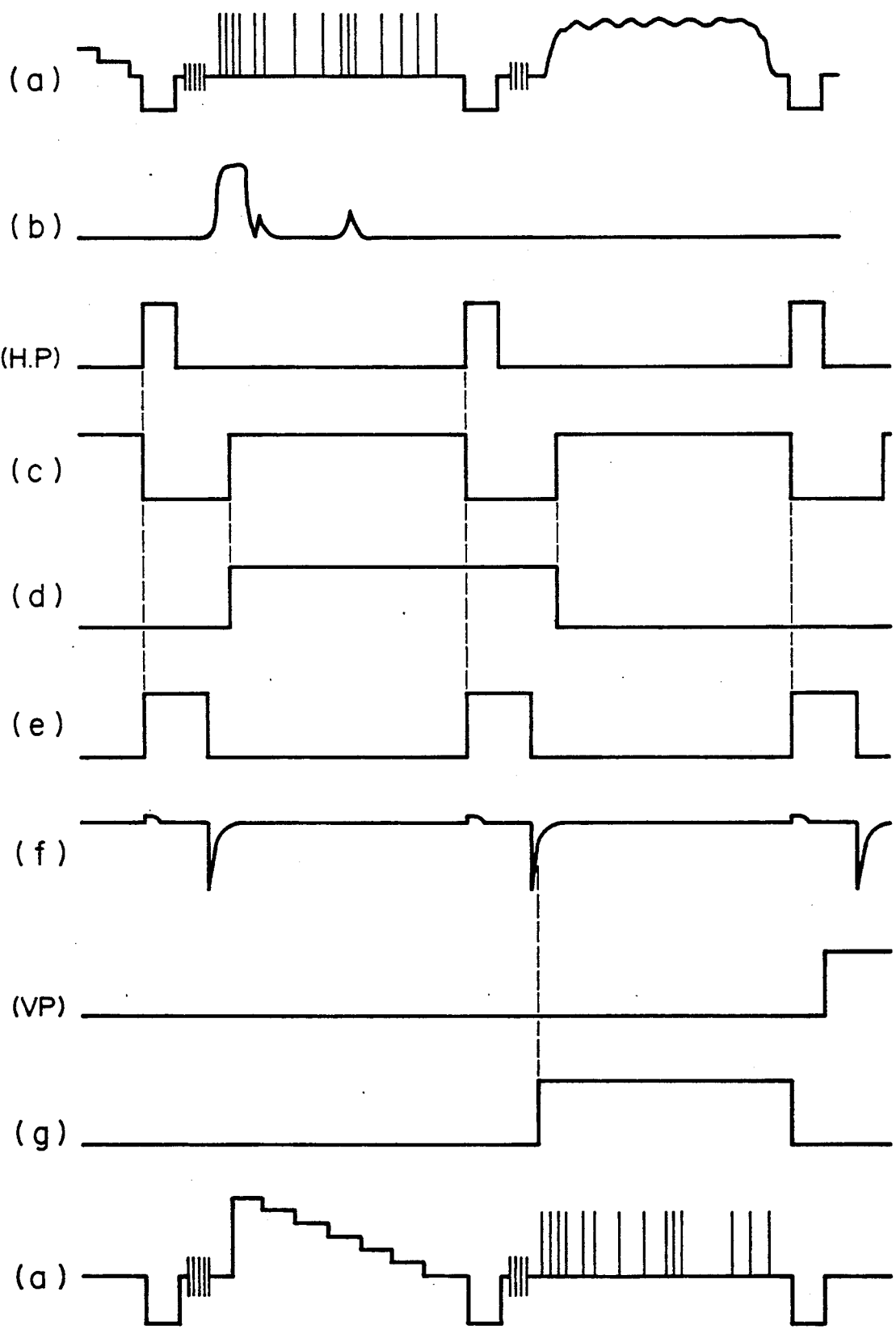
FIG. 3 is a waveform chart for explaining the operation of the teletext detection circuit of FIG. 2.
Figure 4:
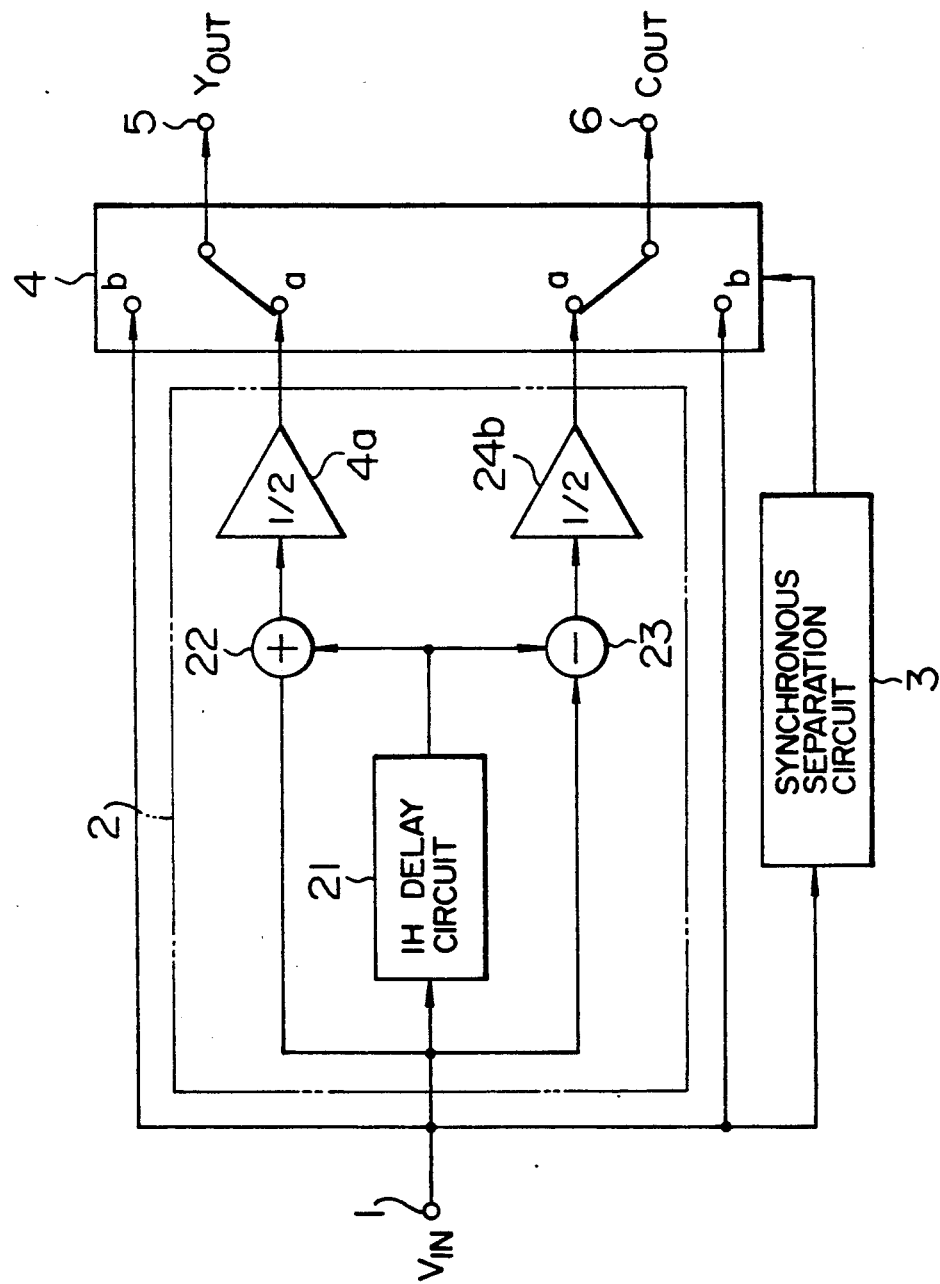
FIG. 4 is a block diagram showing the circuit configuration of a conventional Y/C separator.

Now, let us consider a case where an input signal includes a teletext signal (that is, bit synchronized code) in the vertical retrace interval of the input signal, as indicated by a waveform (a) in FIG. 3. Those frequency components of the bit synchronized code which lie in a 2.8 MHz pass band are extracted by the band-pass amplifier 71, and are then detected by the detection circuit 72. Thus, the output of the detection circuit 72 has a waveform (b) shown in FIG. 3.

While, a horizontal synchronizing pulse HP from the synchronous separation circuit 3 is applied to the monostable multivibrators 73 and 75. The output pulse of the multivibrator 73 falls in synchronism with the leading edge of the horizontal synchronizing pulse HP, and the duration of the output pulse of the multivibrator 73 is set as indicated by a waveform (c) in FIG. 3, that is, the output pulse rises at a time when the output of the detection circuit 73 becomes maximum. It is to be noted that the horizontal synchronizing pulse HP having the waveform (HP) is opposite in polarity to a horizontal synchronizing signal included in the waveform (a).

The D-terminal and T-terminal (namely, trigger terminal) of the flip-flop circuit 74 are applied with the waveforms (b) and (c), respectively. Thus, a waveform (d) shown in FIG. 3 is delivered from the Q-terminal (that is, output terminal) of the flip-flop circuit 74.

The monostable multivibrator 75 is set so that an output pulse is generated for a period between the trailing edge of the horizontal synchronizing signal (that is, the leading edge of the horizontal synchronizing pulse HP) and a time when a color burst signal terminates. That is, the output pulse of the monostable multivibrator 75 has a waveform (e) shown in FIG. 3. The output pulse having the waveform (e) is applied to the OR circuit 76 together with the vertical blanking pulse VP, and the output of the OR circuit 76 is applied to the R-terminal (namely, reset terminal) of the flip-flop circuit 77. While, the output waveform (f) of the differentiating circuit made up of the capacitor C and the resistor R is applied to the T-terminal (namely, trigger terminal) of the flip-flop circuit 77. Further, the output waveform (d) of the flip-flop circuit 74 is applied to the D-terminal of the flip-flop circuit 77. Thus, the output pulse of the flip-flop circuit 77 has a waveform (g) shown in FIG. 3. This output pulse is used a the output pulse m1 of the teletext detection circuit 7.

When the output of the detection circuit 72 due to predetermined frequency components of a bit synchronized code existing in the vertical retrace interval exceeds a predetermined level, the teletext detection circuit 7 judged a horizontal scanning period having the bit synchronized code to be a period when a teletext signal is superposed on a television signal, and delivers the output pulse in the next horizontal scanning period. The reason why the output pulse is delivered in the next horizontal scanning period is that the presence of a teletext signal in a horizontal scanning period is detected in the course of the horizontal scanning period.

When a signal waveform which is obtained by delaying the input signal waveform (a) by a time equal to one horizontal scanning period is indicated by a waveform (a') in FIG. 3, the above delay of the output pulse of the teletext detection circuit 7 can be compensated for by carrying out the Y/C separation of the waveform (a') on the basis of the above output pulse. Further, it is necessary to increase the duration of the vertical blanking pulse (VP) by one horizontal scanning period, as shown in FIG. 3.

Referring back to FIG. 1, the monochrome detection circuit 8 judges whether the inputted video signal $V_{in}$ is a monochrome signal or color signal, on the basis of the level of the color burst signal included in the video signal $V_{in}$. When the video signal $V_{in}$ is judged to be the monochrome signal, the monochrome detection circuit 8 delivers an output pulse m2 having a high level.

The output pulses m1 and m2 of the teletext detection circuit 7 and the monochrome detection circuit 8 are applied to the OR circuit 9, the output of which is applied to the switching circuit 4. When one of the output pulses m1 and m2 is put to a high level, the movable contact of the switching circuit 4 is placed on the b-side, to make the outputted chrominance signal $C_{out}$ equal to zero.

The output of the switching circuit 4 is used as the outputted chrominance signal $C_{out}$.

While, the composite video signal $V_{in}$ is delayed by a time corresponding to one scanning period by means of the 1-H delay circuit 21a, and is further delayed by a time necessary for the processing of the chrominance signal by means of the delay circuit 10. That is, the delay time of the video signal outputted from the delay circuit 10 is made equal to the delay time of the outputted chrominance signal $C_{out}$. The outputted chrominance signal $C_{out}$ is subtracted from the output of the delay circuit 10 by the subtracter 11, to obtain an outputted luminance signal $Y_{out}$.

As mentioned above, in an ordinary scanning period of a composite color video signal, Y/C separation is carried out by a 3-line logical comb filter utilizing vertical correlation. In a case where an inputted video signal is a monochrome signal, or in the teletext period of the vertical retrace interval of the inputted video signal, the inputted video signal is used as a luminance signal, as it is. In the remaining period of the vertical retrace interval, Y/C separation is carried out only by a band-pass filter of the non-correlation type.

As has been explained in the above, the present embodiment includes a synchronous separation circuit for a video signal, means for detecting a teletext signal existing in a vertical retrace interval, a Y/C separation circuit of the non-correlation type independent of line correlation, monochrome signal detection means, and switching means for selecting one of the processing of a monochrome signal, the Y/C separation due to vertical correlation, and the Y/C separation of the non-correlation type. That is, in the teletext period of the vertical retrace interval of a composite color video signal, or in a case where a monochrome video signal is used, the switching means is set so that an input video signal is used as a luminance signal, as it is. In other periods of the vertical retrace interval than the teletext period, the switching means is set so that the Y/C separator of the non-correlation type is operated. Thus, the Y/C separation of various signals which are superposed on a video signal in the vertical retrace interval thereof, can be made without distorting the signals.

Although the 3-line logical comb filter 27 is included in the present embodiment; other comb filters may be used, provided that a video signal is delayed by a time corresponding to one horizontal scanning period. Further, in the present embodiment, the vertical correlation circuit 27 is used in both of the Y/C separation of the vertical correlation type and the Y/C separation of the non-correlation type, to make a delay time due to the former Y/C separation equal to a delay time due to the latter Y/C separation. Alternatively, a Y/C separator of the vertical correlation type and a Y/C separator of the non-correlation type may be formed independently of each other.

As has been explained in the foregoing, according to the present invention, the Y/C separation of various signals which are superposed on a video signal in the vertical retrace interval thereof, can be faithfully carried out, and moreover a teletext signal can be recorded and reproduced by a video tape recorder which is provided with the S-video terminal and is required to have a Y/C separator. Accordingly, a transmission system including the Y/C separator can be checked by a reference signal which is superposed on the video signal in the vertical retrace interval thereof.

I claim:

1. An apparatus for carrying out Y/C separation, comprising:
    specified signal detection means for detecting a specified signal transmitted in a vertical retrace interval of an inputted video signal;
    Y/C separation means of a non-correlation type applied with the inputted video signal for carrying out Y/C separation without utilizing line correlation; and changeover means for performing a switching operation so that the inputted video signal is delivered in the specified signal transmission period of the vertical retrace interval of the inputted video signal to be used as a luminance signal, and the Y/C separation means of the non-correlation type has an output delivered in other periods of the vertical retrace interval than the specified signal transmission period.

2. An apparatus according to claim 1, wherein the specified signal is a teletext signal.

3. An apparatus for carrying out Y/C separation, comprising:

synchronous separation means for separating a synchronizing signal from an inputted video signal to deliver the synchronizing signal;

specified signal detection means for detecting a specified signal transmitted in a vertical retrace interval of the inputted video signal, on the basis of the synchronizing signal;

Y/C separation means of a non-correlation type applied with the inputted video signal for carrying out Y/C separation without utilizing line correlation;

Y/C separation means of a vertical correlation type applied with the inputted video signal for carrying out Y/C separation by utilizing line correlation; and changeover means for performing a switching operation so that the inputted video signal is delivered in the specified signal transmission period of the vertical retrace interval of the inputted video signal to be used as a luminance signal, the Y/C separation means of the non-correlation type has an output delivered in other periods of the vertical retrace interval than the specified signal transmission period, and the Y/C separation means of the vertical correlation type has an output delivered in an ordinary video signal transmission period.

4. An apparatus according to claim 3, wherein the specified signal is a teletext signal.

5. An apparatus according to claim 4, wherein the specified signal detection means includes a detection circuit for detecting a bit synchronized signal indicative of the teletext signal to apply a detection output to the D-terminal of a D-type flip-flop circuit, and a monostable multivibrator applied with a horizontal synchronizing pulse separated from the inputted video signal, for generating an output pulse which is applied to the trigger terminal of the D-type flip-flop circuit.

6. An apparatus for carrying out Y/C separation, comprising:

a 1-H delay circuit for delaying a composite color video signal by a time corresponding to one horizontal scanning period, to deliver the video signal thus delayed;

synchronous separation means for separating a synchronizing signal from the composite color video signal, to deliver the synchronizing signal;

teletext detection means for detecting a teletext signal present in a vertical retrace interval of the composite color video signal which is not yet delayed, on the basis of the synchronizing signal;

Y/C separation means of a non-correlation type applied with the composite color video signal for carrying out Y/C separation without utilizing line correlation;

Y/C separation means of a vertical correlation type applied with the composite color video signal for carrying out Y/C separation by utilizing line correlation; and changeover means for performing a switching operation so that the composite color video signal is delivered in the teletext period of the vertical retrace interval of the composite color video signal delayed by a time corresponding to one horizontal scanning period, to be used as a luminance signal, the Y/C separation means has an output delivered in other periods of the vertical retrace interval than the teletext period, and the Y/C separation means of the vertical correlation type has an output delivered in an ordinary video signal transmission period.

7. An apparatus according to claim 6, wherein the teletext detection means includes a band-pass amplifier for amplifying predetermined frequency components of a bit synchronized code indicative of the teletext signal superposed on the inputted composite color video signal, a detection circuit for detecting the output of the band pass amplifier to apply the detection output to the D-terminal of a D-type flip-flop circuit, and a monostable multivibrator applied with a horizontal synchronizing pulse separated from the inputted composite color video signal, for generating an output pulse which is applied to the trigger terminal of the D-type flip-flop circuit.

8. An apparatus according to claim 6 or 7, wherein the Y/C separation means of the vertical correlation type is applied with a plurality of signals which are obtained by delaying the inputted composite color video signal by different time intervals corresponding to integer multiples of one horizontal scanning period of the inputted composite color video signal, to carry out Y/C separation, and wherein the changeover means varies the combination of the input signals applied to the Y/C separation means of the vertical correlation means, to operate one of the Y/C separation means of the vertical correlation type and the Y/C separation means of the non-correlation type.

9. An apparatus according to claim 6, further comprising monochrome detection means for detecting that not the composite color video signal but a monochrome signal is inputted, and changeover means for making a chrominance signal equal to zero and for delivering the inputted monochrome signal, as it is, to use the inputted monochrome signal as a luminance signal, when it is detected that not the composite color video signal but the monochrome signal is inputted.

10. An apparatus according to claim 7, wherein the Y/C separation means of the vertical correlation type is applied with a plurality of signals which are obtained by delaying the inputted composite color video signal by different time intervals corresponding to integer multiplies of one horizontal scanning period of the inputted composite color video signal, to carry out Y/C separation, and wherein the changeover means varies the combination of the input signals applied to the Y/C separation means of the vertical correlation means, to operate one of the Y/C separation means of the vertical correlation type and the Y/C separation means of the non-correlation type.

11. An apparatus according to claim 7, further comprising monochrome detection means for detecting that not the composite color video signal but a monochrome signal is inputted, and changeover means for making a chrominance signal equal to zero and for delivering the inputted monochrome signal, as it is, to use the inputted monochrome signal as a luminance signal, when it is detected that not the composite color video signal but the monochrome signal is inputted.

12. An apparatus according to claim 8, further comprising monochrome detection means for detecting that not the composite color video signal but a monochrome signal is inputted, and changeover means for making a chrominance signal equal to zero and for delivering the inputted monochrome signal, as it is, to use the inputted monochrome signal as a luminance signal, when it is detected that not the composite color video signal but the monochrome signal is inputted.

13. An apparatus according to claim 10, further comprising monochrome detection means for detecting that not the composite color video signal but a monochrome signal is inputted, and changeover means for making a chrominance signal equal to zero and for delivering the inputted monochrome signal, as it is, to use the inputted monochrome signal as a luminance signal, when it is detected that not the composite color video signal but the monochrome signal is inputted.

* * * * *